United States Patent
Groeger

[11] Patent Number: 5,948,493
[45] Date of Patent: Sep. 7, 1999

[54] PLASTIC WRAP WITH CLING LAYER

[75] Inventor: Joseph H. Groeger, Storrs, Conn.

[73] Assignee: Reynolds Metals Company, Richmond, Va.

[21] Appl. No.: 08/895,639

[22] Filed: Jul. 17, 1997

[51] Int. Cl.$^6$ ............................... B65D 33/00; C09J 7/02
[52] U.S. Cl. ............... 428/40.1; 229/87.01; 229/87.03; 427/516; 427/535; 427/536; 428/41.7; 428/42.1; 428/205; 428/354; 428/356; 428/409
[58] Field of Search ................... 428/40.1, 41.7, 428/42.1, 205, 343, 354, 356, 409; 229/87.01, 87.03; 427/535, 536, 516

[56] References Cited

U.S. PATENT DOCUMENTS

| | | | |
|---|---|---|---|
| 4,351,876 | 9/1982 | Doi et al. | 428/349 |
| 4,425,268 | 1/1984 | Cooper | 524/110 |
| 4,504,434 | 3/1985 | Cooper | 264/22 |
| 4,542,188 | 9/1985 | van der Heijden | 525/240 |
| 4,963,388 | 10/1990 | Benoit | 427/29 |
| 5,175,049 | 12/1992 | Huff et al. | 428/218 |
| 5,212,001 | 5/1993 | Brant et al. | 428/34.9 |
| 5,225,257 | 7/1993 | Brant | 428/34.9 |
| 5,538,790 | 7/1996 | Arvedson et al. | 428/349 |

*Primary Examiner*—Nasser Ahmad
*Attorney, Agent, or Firm*—Alan M. Biddison

[57] ABSTRACT

In order to form a plastic wrap which exhibits little or no cling until such time as the wrap is applied to an article or the like, the adhesive layer, which is formed on one side of a sheet of olefinic polymer, is exposed to a treatment which superficially oxidizes or cross-links the outer layer of adhesive material to form a film which exhibits greatly attenuated adhesion. This film is disruptable as the wrap is applied and is stretched and or deformed in a manner which uncovers the adhesive material and endows cling properties on at least localized areas of the wrap. Techniques for treating the adhesive layer include UV irradiation, exposure to corona and ozonification.

11 Claims, 1 Drawing Sheet

PLASTIC WRAP WITH CLING LAYER

BACKGROUND OF THE INVENTION

1. Field of the Invention

The present invention relates to a plastic wrap with a cling layer. More specifically, the present invention relates to a plastic wrap having an adhesive cling layer wherein the adhesive layer is modified to reduce or eliminate the amount of cling produced until the modified surface is disrupted by stretching/application of the wrap.

2. Description of the Related Art

Olefinic polymers, particularly polymers of ethylene, are employed in a variety of end use applications including the preparation of wrapping films. In conventional wrapping processes, e.g. spin or rotary stretch wrapping techniques, the polymeric film is wound under tension around a package by either rotating the package on a turntable or by winding the film around a stationary package. In such applications, it is generally desirable for the overlapping portions of the film to adhere to each other thereby self-sealing the wrap without the need for an external adhesive or heat sealing operation.

To achieve the above, it has been proposed to provide one surface of the wrap with cling properties which allow the wrap to cling to itself, and to provide the other side with so called "slip" characteristics which endow a low coefficient of friction on an outer, non-cling surface. The provision of this slip surface prevents adjacent packages which are wrapped individually in cling wrap, from sticking to each other and from undergoing possible damage when pulled apart.

In order to impart cling properties or improve the cling of the cling side of such films, it has been proposed to add tackifying additives or to use acrylates in the (co)polymer. However, the use of tackifiers has disadvantages in that, while these enhance the cling properties of the wrap they tend to induce a number of drawbacks. For example, they tend to have an adverse effect on the optical properties of the film and enhance surface migration of the additive(s). This type of migration can induce rolls of the wrap to telescope and/or collapse. A further problem is encountered in the instance wherein the tackifier is "picked off" onto the slip side of the film while the film is rolled due to the slip and cling layers being maintained in intimate contact.

In order to promote the slip characteristics of the slip surface of the wrap, it is possible to treat one side (viz., the outer, non-cling side) of the film in a manner which promotes a reduction in the coefficient of friction. This can be achieved through the use of anti-cling and/or antiblock additives including silicas, silicates, diatomaceous earth and various lubricants. U.S. Pat. No. 5,225,257 to Brant discloses the use of corona discharge for modifying the outer slip surface of the wrap and for improving the anti-cling characteristics.

However, despite the above progress, a drawback is encountered in that the very cling characteristics which are vital during application, tend to interfere with handling and storage during production, roll release and ease of use by the consumer.

Accordingly, there still exists a need for a plastic cling wrap which is easy to handle during production and storage, and which still produces the desired amount of "cling" when used to wrap an article or the like.

SUMMARY OF THE INVENTION

It is an object of the present invention to provide a cling wrap that exhibits limited or no cling characteristics until such time as a consumer applies the wrap to an article or the like.

It is a further object of the present invention to provide a cling wrap which is easy to manufacture and which exhibits a thin protective layer which is disrupted to expose unmodified adhesive when the wrap is stretched and/or applied to an item by a consumer.

In brief, the above and other objects are achieved by modifying an adhesive layer, which is formed on one side of a sheet of olefinic polymer, by exposing it to a treatment which superficially oxidizes or cross-links the outer layer of adhesive material and forms a thin film which exhibits greatly attenuated adhesion. This film is disruptable as the wrap is applied and is stretched and or deformed in a manner which uncovers the adhesive material and endows cling properties on at least localized areas of the wrap.

More specifically, a first aspect of the present invention resides in a plastic wrap comprising: a plastic sheet; an adhesive layer formed on a side of the sheet; an adhesive attenuating film formed on an outer surface of the adhesive layer, the adhesive attenuating film being disrupted on stretching/deformation of the sheet in a manner which exposes portions of the adhesive layer formerly covered with the adhesive attenuating film.

A second aspect of the invention resides in a method of forming a plastic wrap having cling properties, comprising the steps of: coating a first side of a plastic sheet with a layer of adhesive; and modifying the surface of the adhesive layer to form a film having attenuated adhesion. In accordance with this aspect of the invention the step of modifying the surface of the adhesive layer include one or more of: exposing the adhesive layer to UV radiation; exposing the adhesive layer to a corona; inducing cross-linking in the surface of the adhesive layer; and oxidizing the surface of the adhesive layer such, as by ozonification, to form the requisite film.

A third aspect of the invention resides in a plastic wrap having cling characteristics which is formed by: coating a first side of a plastic sheet with a layer of adhesive; and modifying the surface of the adhesive layer to form a film having attenuated adhesion.

It is to be appreciated that treatment of the adhesive layer in accordance with the present invention differs from that disclosed in the above mentioned U.S. Pat. No. 5,225,257 in that the latter seeks to provide a permanent reduction in the cling properties of a non-cling surface, while the invention provides a temporary cling inhibition to the cling surface per se. Thus, the invention is founded on the discovery that the cling surface can be temporarily modified in a manner which promotes handling and storage, yet uniquely permits the return of adequate cling properties during the actual application of the wrap.

BRIEF DESCRIPTION OF THE DRAWINGS

The various merits and advantages of the present invention will become more apparent as a description of the preferred embodiments of the invention is given with reference to the appended drawings wherein.

DETAILED DESCRIPTION OF THE PREFERRED EMBODIMENTS

Figure 1:
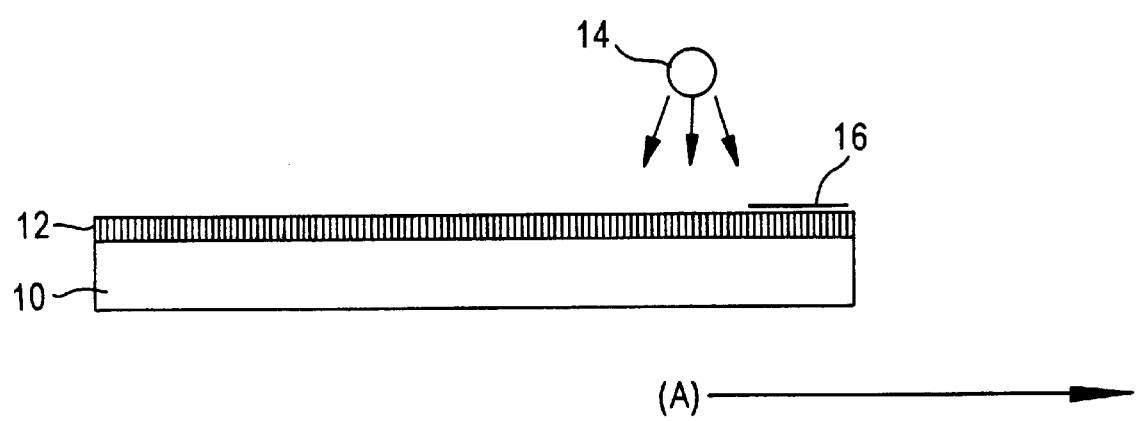
FIG. 1 is a schematic cross-sectional view showing an adhesive layer being modified in a manner which forms an adhesive characteristic attenuating film in accordance with the present invention.

In accordance with the present invention, a suitable substrate film or sheet 10 made of an olefinic polymer, for example, is coated with a suitable adhesive or tackifier layer 12. The coated film 10 is then, as shown in FIG. 1, transported past a suitable UV and/or corona discharge source 14 in the direction indicated by the bold arrow (A) so as to modify the outer surface of the adhesive layer 12 and form a thin oxide film 16 which is essentially devoid of adhesive characteristics. In this embodiment, the oxide film 16 is formed essentially over the entire surface of the adhesive layer 12.

This process produces a plastic wrap which exhibits greatly attenuated or totally inhibited adhesion characteristics without the need for external agents or the like. In this condition, the plastic wrap is, because of the attenuated adhesion characteristics, much easier to handle, roll and store than conventional wraps. It also permits the consumer to remove a length of the wrap from a roll with less resistance and tendency to fold up and stick to itself than possible with conventional products.

Figure 2:
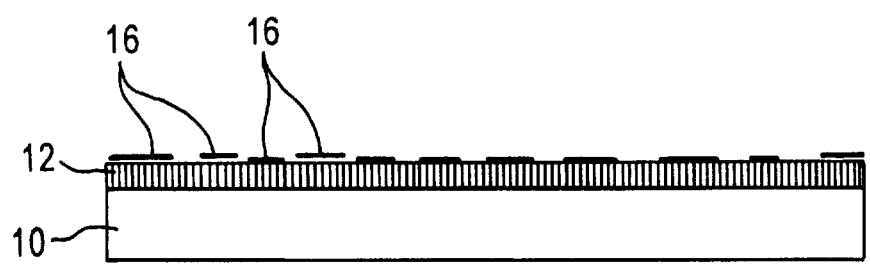
FIG. 2 is a schematic cross-sectional view of a piece of film produced in accordance with the present invention, showing the manner in which the film, which attenuates the adhesive characteristics, is broken and exposes unmodified portions of the adhesive layer when the plastic wrap is stretched and/or distorted during application.

When the wrap according to the present invention is applied to an article or the like, the wrap stretches and the areas of the wrap which undergo distortion are such that the film oxide 16 is broken and unmodified areas of the adhesive layer 12 are exposed in the manner illustrated in FIG. 2. This provides these portions of the wrap with the desired cling characteristics which adhere to the surface or surfaces against which it is brought into contact.

In summary, the present invention provides a wrap which overcomes the above mentioned drawbacks with the prior art in that it provides a thin adhesive characteristics attenuating film over the adhesive layer. This thin film facilitates the rolling and handling of the film during production, tends to inhibit the "pick off" problem wherein the adhesive layer tends to, at least in part, become attached to the slip surface of the wrap, and further facilitates the unrolling and application of the wrap. The unique property wherein the adhesive layer becomes selectively uncovered when the wrap is stretched during application greatly enhances the utility of the wrap.

It will be appreciated that the techniques via which the surface of the adhesive layer can be treated, are not limited to UV and/or corona exposure and that a number of other techniques, such as exposure to ozone (ozonification) which induce either oxidation or cross-linking of the surface of the adhesive layer in a manner to form a thin disruptable film, can be used without departing from the scope of the invention which is limited only by the appended claims.

For examples of the type of polymer and adhesive which can be used in accordance with the present invention, reference can be had to U.S. Pat. No. 4,542,188 issued on Sep. 17, 1985 in the name of van der Heijden. Reference can also be had to U.S. Pat. No. 4,425,268 issued on Jan. 10, 1984 in the name of Cooper. The content of these two patents is hereby incorporated by reference thereto.

What is claimed is:

1. A plastic wrap comprising:
   a plastic sheet;
   an adhesive layer formed on a side of said sheet;
   an adhesive attenuating film formed on an outer surface of the adhesive layer, said adhesive attenuating film being disrupted on stretching/deformation of said sheet in a manner which exposes portions of the adhesive layer formally covered with said adhesive attenuating film.

2. A method of forming a plastic wrap having cling properties, comprising the steps of:
   coating a first side of a plastic sheet with a layer of adhesive; and
   modifying the surface of the adhesive layer to form a film having attenuated adhesion and which can be disrupted by stretching/deformation to expose portions of the adhesive layer which are attenuatedly adhesive, to impart cling characteristics to the wrap.

3. A method as set forth in claim 2, wherein said step of modifying comprises the step of exposing the adhesive layer to UV radiation.

4. A method as set forth in claim 2, wherein said step of modifying comprises the step of exposing the adhesive layer to a corona.

5. A method as set forth in claim 2, wherein said step of modifying comprises the step of inducing cross-linking in the surface of the adhesive layer.

6. A method as set forth in claim 2, wherein said step of modifying comprises the step of oxidizing the surface of the adhesive layer.

7. A plastic wrap which is formed by:
   coating a first side of a plastic sheet with a layer of adhesive; and
   modifying the surface of the adhesive layer to form a film having attenuated adhesion and which can be disrupted by stretching/deformation to expose portions of the adhesive layer which are unattenuatedly adhesive, to impart cling characteristics to the wrap.

8. A plastic wrap as set forth in claim 7, wherein said step of modifying comprises the step of exposing the adhesive layer to UV radiation.

9. A plastic wrap as set forth in claim 7, wherein said step of modifying comprises the step of exposing the adhesive layer to a corona.

10. A plastic wrap as set forth in claim 7, wherein said step of modifying comprises the step of inducing cross-linking in the surface of the adhesive layer.

11. A plastic wrap as set forth in claim 7, wherein said step of modifying comprises the step of oxidizing the surface of the adhesive layer.

* * * * *